May 14, 1957  R. A. PETERSON  2,792,067
GEOPHYSICAL PROSPECTING SYSTEM
Filed Nov. 12, 1952  3 Sheets-Sheet 1

RAYMOND A. PETERSON
INVENTOR.

BY
*Reed␣␣Lawlor*
ATTORNEY.

May 14, 1957 R. A. PETERSON 2,792,067
GEOPHYSICAL PROSPECTING SYSTEM
Filed Nov. 12, 1952 3 Sheets-Sheet 2
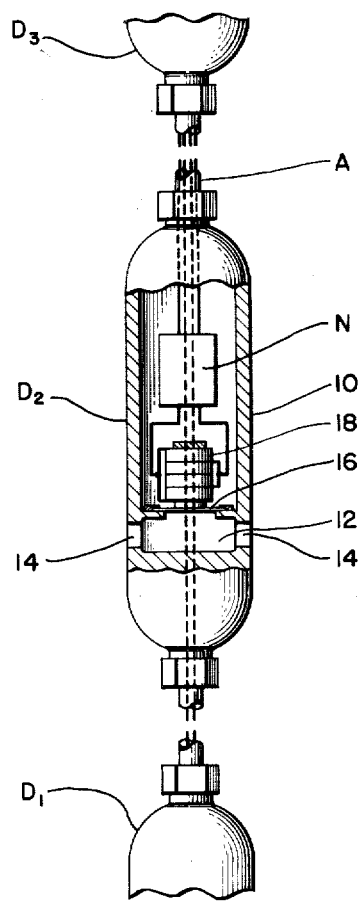
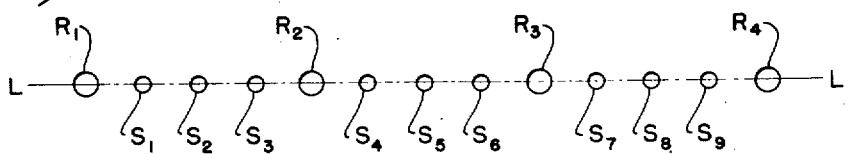
RAYMOND A. PETERSON,
INVENTOR.

May 14, 1957  R. A. PETERSON  2,792,067
GEOPHYSICAL PROSPECTING SYSTEM
Filed Nov. 12, 1952  3 Sheets-Sheet 3
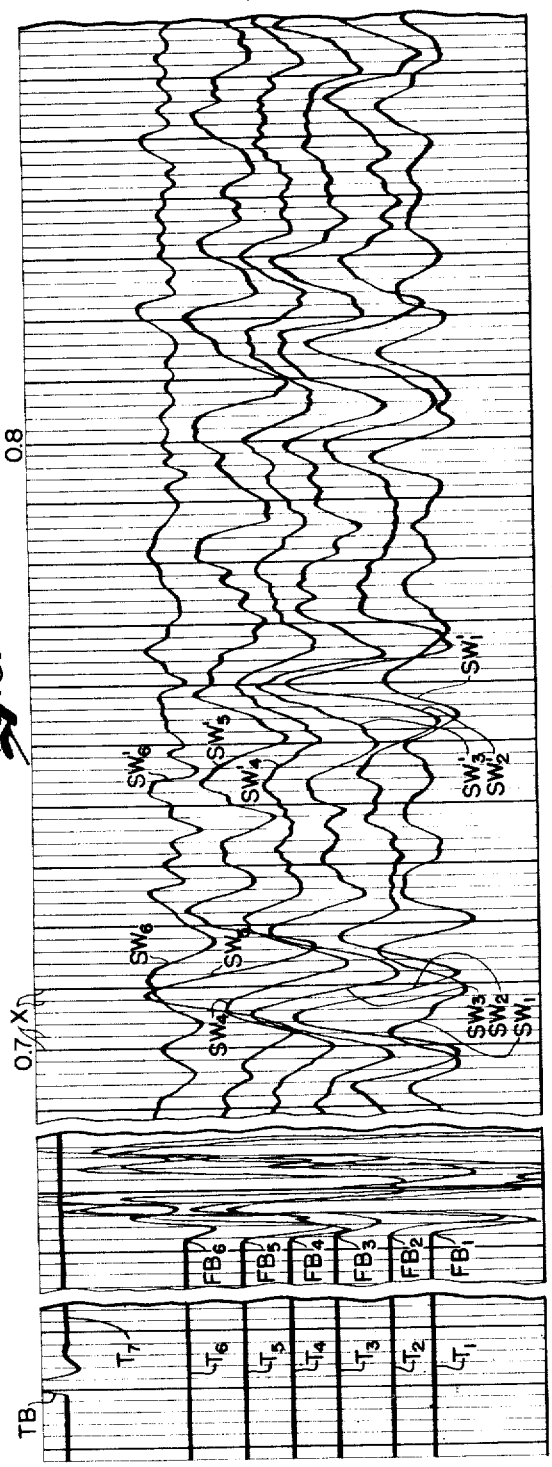
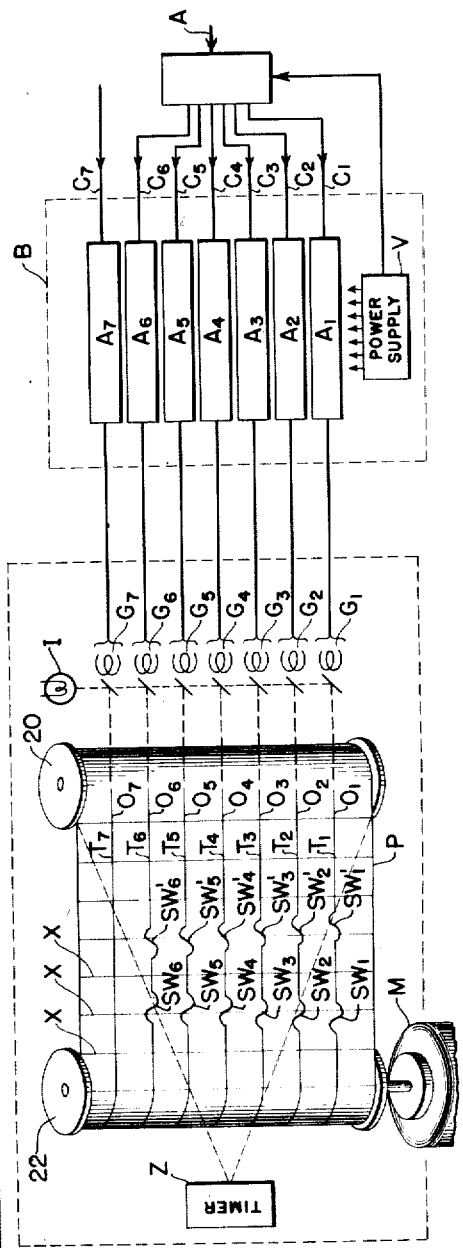
RAYMOND A. PETERSON,
INVENTOR.
BY
ATTORNEY

United States Patent Office 2,792,067
Patented May 14, 1957

2,792,067
GEOPHYSICAL PROSPECTING SYSTEM

Raymond A. Peterson, Altadena, Calif., assignor, by mesne assignments, to United Geophysical Corporation, Pasadena, Calif., a corporation of California Application November 12, 1952, Serial No. 319,969

14 Claims. (Cl. 181—.5)

This invention relates to geophysical prospecting methods, and more particularly to improvements in methods and apparatus employed in reflection seismic surveying. Two methods of reflection seismic surveying are commonly employed. One of these methods is designated by the name "correlation shooting." The other method is known as "continuous profiling."

In reflection seismic surveying, seismic waves are generated by detonating an explosive charge at a shot point adjacent the surface of the earth, usually below the weathered layer. The seismic waves so generated travel downwardly through successive subterranean strata and small amounts of the energy in the seismic waves are reflected upwardly by the successive strata. Reflected waves returning to the surface of the earth from the various strata are detected at various seismic wave receiving stations located at the surface of the earth and records are made of the returned waves. The time required for the waves to travel from the generating station to the successive strata and thence by reflection to the receiving stations is determined from the records, and these times are employed in the determination of the depth, the strike and the dip of the various reflecting strata. In correlation shooting the similarity of waves in different records is employed to recognize reflections from different widely spaced-apart portions of various strata.

In continuous profiling, a large number of receiving stations are employed and they are so arranged relative to the generating stations that waves are reflected from sub-surface strata from a series of relatively closely spaced points, and the time of travel of waves from closely spaced points that are recorded on different records is very nearly the same. Continuous profiling methods are described and claimed in Patent No. 2,329,721 issued to Herbert Hoover, Jr. et al. and Patent No. 2,259,478 issued to Charles Gill Morgan. As explained in those patents, continuous profiling is conducted by generating seismic waves at one or more generating stations and receiving the seismic waves at a number of spreads of receiving stations, but changing either the generating station or the spread of receiving stations or both between successive records. In any event, in continuous profiling, seismic waves are reflected from successive contiguous portions of the sub-surface strata while the time relationship mentioned above is maintained. In continuous profiling, similarity of waves reflected from closely spaced points is employed to recognize reflections from adjacent parts of various strata.

In correlation shooting, a small number of reception points are employed in the neighborhood of each of the generating points and the portions of the subterranean strata from which the reflected waves are received are generally more or less isolated from each other, being spaced apart by gaps that are large compared to the lengths of the portions of the subterranean strata from which waves are reflected from a particular generating point and received simultaneously at a particular spread of reception points. But in continuous profiling, such gaps are either absent or are small compared with the lengths of the portions of the subterranean strata from which reflected waves are recorded. The resultant survey of the subterranean formations determined from the records of the waves received either in the continuous profiling method or in correlation shooting is employed to determine where petroleum is most likely to be found in the area surveyed. This information is then employed as a guide in locating wells in an area under investigation or undergoing development.

In practice, it is desirable to record high frequency components of the reflected seismic waves accurately. The recording of such components facilitates the accurate measurement of the times required for a seismic wave to travel from a generating point to various reflecting strata and thence to a reception point. Accuracy in such measurements, in turn, assists the making of accurate surveys of subterranean formations.

In both continuous profiling and in correlation shooting, the waves are received by seismometers located at reception points at or adjacent the surface of the earth. Frequently, seismometers are placed directly upon the surface of the earth. Sometimes they are buried a short distance beneath the adjacent part. In either event, the surface of the earth constitutes an elastic medium which acts as a resilient member supporting the mass of the seismometer. Such a system has a resonance characteristic dependent upon the elastic properties and the density of the earth material, and also upon the mass and other properties of the seismometer. Very frequently, the resonant frequency of the system so formed lies in the range of between about 100 and about 200 C. P. S. (cycles per second). Since reflected seismic waves frequently contain substantial energy in that frequency range, the apparent time of reception of the waves varies from one seismometer to another because of the fact that the various resonant systems formed between the various seismometers and the ground have different resonant frequencies. Errors also arise because the damping characteristics of the resonant systems vary from one receiving station to another. For this reason, seismic waves received at the various seismometers are affected in different ways or to different degrees, causing errors in the timing of the recording of the waves.

Usually, an area to be explored by the methods of reflection seismic surveying has a weathered layer overlying a series of strata. Such a weathered layer is characterized by a relatively low seismic wave velocity in the range of about 500 feet per second to about 2,000 feet per second. The weathered layer also varies in thickness from one such point to another. Furthermore, the velocity varies from point to point horizontally in the area under investigation. As is well known, account is taken of such variations by weathering correction techniques.

Generally, beneath the weathered layer, there is a series of strata that are characterized by relatively high seismic wave velocities of 5,000 feet per second and higher. This velocity generally increases with depth. The velocity at any depth or in any particular stratum is relatively uniform from point to point throughout the area, or at least if it does vary, it varies to a smaller degree and in a relatively uniform manner compared with the corresponding variations in velocity in the weathered layer.

According to the present invention, reflected seismic waves are received at a plurality of seismic wave receiving stations that are arranged beneath the weathered layer in a substantially straight vertical line that is displaced horizontally from the generating station. In the best mode of practicing this invention now contemplated, a substantial number, if not all, of the receiving stations are located at a depth of about a wavelength or more beneath the weathered layer. Furthermore, in the best mode of practicing this invention, the receivers located at the receiving stations are in the form of hydrophones, which are immersed in liquid in a receiver hole.

One advantage of this invention lies in the fact that the need for making weathering corrections is eliminated.

Another advantage lies in the fact that, generally speaking, a larger portion of the energy in the reflected waves received is at higher frequencies than would be the case if the receivers were located at or near the upper surface of the weathered layer. One advantage of locating the receivers at a substantial depth beneath the bottom of the weathered layer lies in the fact that the waves received are disturbed less than they otherwise would be, by scattered waves traveling downwardly from the bottom of the weathered layer and by noise from other sources.

Another advantage of this invention is that upwardly traveling waves may be distinguished from downwardly traveling waves, thus eliminating uncertainty in identifying the upwardly traveling reflected waves arriving at any particular point in the group of receivers.

Other features and advantages of this invention will be apparent from the following specification taken in connection with the accompanying drawings wherein:

Fig. 2 is a plan view showing an arrangement of generating stations and receiver stations along the line of exploration;

Fig. 3 is an enlarged view of a hydrophone employed in my invention;

Fig. 4 is a schematic diagram of recording apparatus employing this invention; and Fig. 5 is a diagram of a multiple trace record of the type obtained with this invention.

Figure 1:
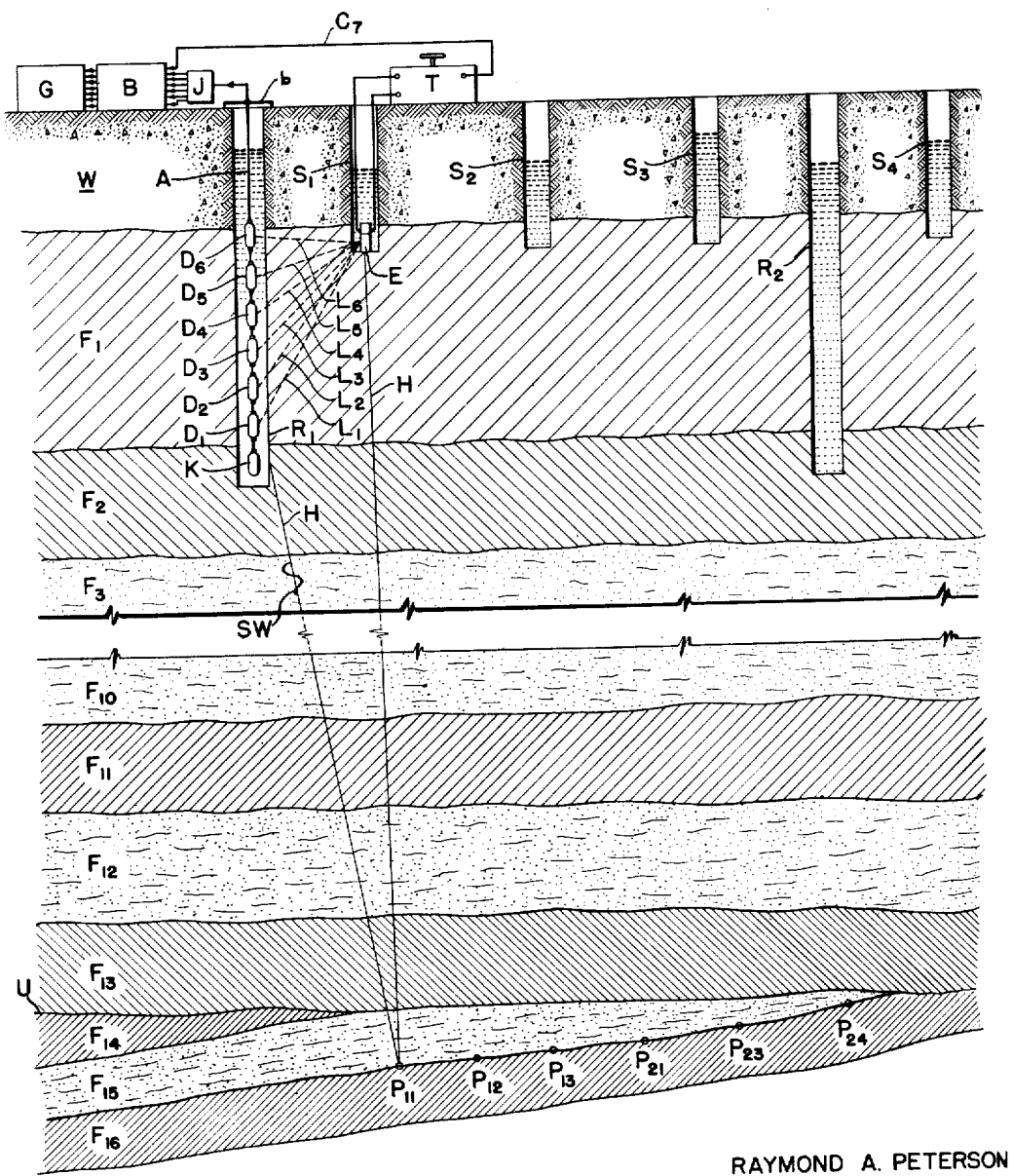
Figure 1 is a vertical cross-sectional view of the earth along a line of exploration illustrating the application of this invention thereto.

Referring to the drawings, and particularly to Figs. 1 and 2, there is illustrated an embodiment of the invention including a series of seismic wave generating stations located at shot points $S_1$, $S_2$, $S_3$, $S_4$ ... $S_9$ and a series of receiving stations located at reception points $R_1$, $R_2$, $R_3$, $R_4$, all arranged along a line of exploration L—L in an area being surveyed.

Considered broadly, as indicated in Fig. 1, the area under investigation comprises a weathered layer W adjacent the surface of the earth and a series of sub-surface formations $F_1$, $F_2$, $F_3$ ... $F_{10}$, $F_{11}$, $F_{12}$, $F_{13}$, $F_{14}$, $F_{15}$ and $F_{16}$ ..., all arranged in descending order beneath the weathered layer. In the particular application of the invention illustrated, the strata $F_1$ ... $F_{13}$ are all substantially horizontal, having dips of about one or two degrees, or so, but the strata $F_{14}$, $F_{15}$ and $F_{16}$ have larger dips of four or five degrees, or so, the two sets of strata being separated by what is known in geology as an unconformity U.

In the particular embodiment of the invention illustrated, as indicated in Fig. 2, the shot points $S_1$, $S_2$ ... $S_9$ are uniformly spaced in the order named at known positions along the line of exploration. The reception points $R_1$, $R_2$ ... $R_4$ are also uniformly spaced in the order named at known positions along the line of exploration but are spaced apart farther than the shot points. The shot points $S_1$, $S_2$ and $S_3$ are symmetrically arranged between reception points $R_1$ and $R_2$, the shot points $S_4$, $S_5$ and $S_6$ are symmetrically arranged between the reception points $R_2$ and $R_3$, and the shot points $S_7$, $S_8$ and $S_9$ are symmetrically arranged between the reception points $R_3$ and $R_4$. As is explained below, the number of shot points compared with the number of reception points may be reduced and some of the advantages of the invention may be obtained even if only one shot point is located between adjacent reception points.

The seismic wave generating stations $S_1$, $S_2$, $S_3$ ... $S_9$ are in the form of shot holes of known depths drilled into the earth through the weathered layer, the bottoms of the shot holes being disposed at relatively shallow known depths beneath the weathered layer in one of the underlying formations. Seismic waves may be generated in various ways at such a station. Ordinarily, the waves are generated by placing a charge of explosive E at the bottom of each shot hole, such as shot hole $S_1$, holding the charge firmly in place by means of a column of liquid, such as drilling mud, in the hole, and detonating the charge while so held in place. By so generating seismic waves in underlying formations beneath the weathered layer, sharper explosions are produced than would ordinarily be produced if the explosive were detonated at the surface or in the weathered layer itself. By virtue of this fact, as is well known, a seismic wave is generated which is relatively rich in high-frequency components, and which is of relatively uniform character from one shot point to another.

A seismic wave so generated at any generating station radiates therefrom in all directions. Some of the energy travels downwardly and is partially reflected upon encountering discontinuities existing between successive strata $F_1$, $F_2$ ... $F_{15}$, $F_{16}$ ... The reflected waves are received, detected at various receiving stations and then recorded.

According to this invention, at each of the receiver stations $R_1$ ... $R_4$ a receiver hole is drilled into the earth through the weathered layer and into the underlying formations, and a series of seismic wave receivers $D_1$, $D_2$, $D_3$, $D_4$, $D_5$, $D_6$ are arranged at known depths at mutually spaced points along a vertical line in each receiver hole when reflected waves are to be detected there. For example, when reflected waves are to be detected at the first receiver hole $R_1$, the seismic wave receivers $D_1$ ... $D_6$ are arranged in the sequence named on a multi-conductor cable A tied or clamped to a cross-bar $b$ resting on the ground at the top of the hole. A sinker K, attached to the bottom of the cable, maintains the cable taut. The receivers $D_1$ ... $D_6$ are spaced about ten feet apart, and the sinker K is normally suspended above the bottom of the receiver hole, though, it will be understood, even if it is on the bottom, satisfactory results may be obtained. While the uppermost receiver may be directly beneath the bottom of the weathered layer, as indicated in Fig. 1, it is best if it is at least about 75 feet beneath that position, as explained more fully hereinafter.

In the best mode of practicing the invention now contemplated, the receivers $D_1$ ... $D_6$ are in the form of hydrophones that are immersed in liquid, such as drilling mud, that fills the receiver hole.

The upper end of the multi-conductor cable A leads to a junction box J where, as indicated more clearly in Fig. 4, the conductors $C_1$, $C_2$ ... $C_6$ that lead upwardly from the respective receivers $D_1$ ... $D_6$ are separated and connected to various corresponding amplifiers $A_1$ ... $A_6$ in an amplifier bank B. The outputs of the respective amplifiers are connected to corresponding galvonometers $G_1$ ... $G_6$ of a seven-element oscillographic recorder G. The amplifiers employed are so designed as to reproduce frequency components of the seismic waves in the high-frequency range, above about 100 C. P. S. and up to 200 C. P. S., and even higher, with as much amplification as or even more amplification than lower frequency components. A blaster T, operatively connected with an explosive charge E, is connected through an auxiliary circuit $A_7$ to a galvonomeer $G_7$. A power supply V supplies any needed voltages to the amplifiers $A_1$ ... $A_6$ and the circuit A.

In making a record in accordance with the method of this invention, seismic waves are generated at the bottom of one of the shot holes, such as shot hole $S_1$, and recorded by means of the receivers $D_1 \ldots D_6$ in one of the receiver holes, such as receiver hole $R_1$. Prior to detonating the charge of explosive E, the motor M of the oscillograph O is energized, causing a strip of recording paper P normally carried on a storage spool 20 to be wound onto a takeup spool 22, causing the paper to advance at a uniform speed past recording positions $O_1, O_2, O_3, O_4, O_5, O_6$ and $O_7$, onto which light from a lamp I is focused by the respective galvonometers $G_1, G_2, G_3 \ldots G_7$. As the paper advances, oscillographic traces $T_1, T_2 \ldots T_7$ are formed thereon by the respective galvonometers $G_1, G_2 \ldots G_7$.

At the instant that the charge of explosive E is detonated by manipulation of the blaster T, an electrical pulse from the blaster is transmitted over conductor $C_7$ through circuit $A_7$, and thence to the galonometer $G_7$. The pulse applied to the galonometer $G_7$ causes the beam of light striking the paper at the position $O_7$ to produce a time break TB on the trace $T_7$. As the seismic wave radiates outwardly from the explosive charge, some of the energy travels by substantially direct straight paths to the respective receivers $D_1 \ldots D_6$, while other portions of the energy travel downwardly partly passing through the various subterranean strata $F_1 \ldots F_{16}$ and being partially reflected thereby. The path H of a wave reflected by the interface between the strata $F_{15}$ and $F_{16}$ is indicated in Fig. 1.

As seismic waves arrive at the various receivers $D_1 \ldots D_6$, they cause fluctuations to occur in the pressure of liquid in the receiver hole. These fluctuations in pressure actuate the hydrophones $D_1 \ldots D_6$ causing them to generate electrical waves, which are amplified by the various amplifiers $A_1 \ldots A_6$, the amplified outputs of which actuate the corresponding galvonometers $G_1 \ldots G_6$. As the waves arrive at the receivers $D_1 \ldots D_6$, the light beams reflected from the various corresponding galvonometers $G_1 \ldots G_6$ are deflected transversely to the length of the paper strip P, causing traces of the waves to be made thereon, as indicated in Figs. 4 and 5. Thus, the waves arriving at the receivers $D_1 \ldots D_6$ by direct paths $L_1 \ldots L_6$, being the first waves to arrive at the receivers in this particular case, produce first breaks $FB_1, FB_2 \ldots FB_6$, as shown in Fig. 5. Thereafter, waves arriving at the various receivers by travel along other paths including the reflection path H, produce the remainder of the oscillographic traces $T_1 \ldots T_6$. As the waves are recorded, a timer Z forms timing lines X at regular intervals on the paper strip P.

Consider for a moment what occurs when a particular individual seismic wave SW travels upwardly to the receivers $D_1 \ldots D_6$ after reflection from the interface between the strato $F_{15}$ and $F_{16}$. As this wave SW travels upwardly, it arrives at the receivers $D_1 \ldots D_6$ in the sequence mentioned and then travels onwardly toward the surface. Upon encountering the bottom of the weathered layer W, or the air-earth surface itself, the wave is reflected downwardly, usually being reversed in phase. As this wave SW travels upwardly along the receiver hole $R_1$, various waves $SW_1, SW_2 \ldots SW_6$ are recorded on the paper strip P, appearing on the successive traces $T_1 \ldots T_6$ in the sequence mentioned. But after being reflected, the downwardly travelling wave arrives at a later time at the receivers in reverse order. The downwardly traveling wave is recorded as waves $SW_1' \ldots SW_6'$ on the traces $T_1 \ldots T_6$ in the reverse sequence. Here it will be noted that if the step-out of the first group of recorded waves $SW_1 \ldots SW_6$ is positive, the step-out of the second group of waves $SW_1' \ldots SW_6'$ is negative, that is, the slope of the recorded waves $SW_1 \ldots SW_6$ on the paper strip P lies in one direction across the strip while the slope of the other set of recorded waves $SW_1' \ldots SW_6'$ lies in the opposite direction across the strip. Thus, it will be noted, for example, in the actual record illustrated in Fig. 5 that the group of waves occurring at about 0.76 second on the record are downwardly traveling waves, whereas, the waves appearing at about .705 second and 0.80 second are both upwardly traveling waves.

It is thus apparent that by employing a series of seismic wave receivers aligned vertically in the receiver hole, it is possible to distinguish between upwardly traveling waves and downwardly traveling waves arriving at the receiver hole. This is important, since it eliminates the possibility of mistaking downwardly traveling waves for upwardly traveling waves. If this distinction is not made, as when only a single receiver is employed in the receiver hole, downwardly traveling waves that have been reflected from an underlying stratum and then reflected downwardly by the weathered layer or the air-earth surface may be mistaken for upwardly traveling waves reflected from a deeper underlying stratum. The employment of a plurality of receivers also has the advantage that the plurality of traces produced may be examined and properly weighted to determine more accurately than otherwise the time of occurrence of the reflected wave than would otherwise be possible. The reason for this is that random disturbances such as noise and scattered waves tend to obscure the reflected waves somewhat. An experienced interpreter of seismic wave records is thus able to accurately measure the time when a seismic wave arrives at a particular receiver or at a particular depth in the receiver hole, by examining the plurality of traces.

According to this invention, the uppermost of the receivers $D_1 \ldots D_6$ is preferably located in the receiver hole at a depth of at least about 75 feet below the weathered layer. This distance is approximately equal to the wavelength of a large portion of the energy present in reflected waves. By so locating the receiver beneath the bottom of the weathered layer, the effects of scattering of reflected waves at various portions of the interface between the weathered layer and the adjacent subterranean stratum are largely reduced. By reducing such effects, increased accuracy is achieved.

By recording reflected seismic waves received beneath the weathered layer, all need for making weathering corrections and errors from inaccuracies occurring in such corrections are eliminated. Another advantage or recording the reflected seismic waves beneath the weathered layer lies in the fact that a larger portion of the energy of the seismic waves received below the weathered layer is in the high-frequency range than would be the case if the recording was made in or at the top of the weathered layer.

In practicing this invention, it has been found that best results are frequently obtained by employing shot holes that are shallower than the receiver holes. The use of shot holes and receiver holes having such depth relations often results in the production of more legible records; and also results in an economy in drilling, especially where the number of shot holes is greater than the number of receiver holes.

Also in accordance with this invention, the seismic wave receivers $D_1 \ldots D_6$ are placed approximately ten feet apart, that is, they are spaced apart a distance which is a small fraction of about one-eighth of the wavelength mentioned above. In this way, the waves recorded on successive traces tend to nest or to overlap closely in an echelon pattern, thus facilitating the recognition of records of the same reflected wave on successive traces. Such recognition is also aided by locating all the hydrophones in a portion of the receiver hole that lies in a single sub-surface stratum.

Also in accordance with this invention, as explained above, hydrophones are employed as seismic wave receivers. A hydrophone of the type that I prefer to use, which is illustrated schematically in Fig. 3, comprises a case 10 having a lateral passage 12 terminating in windows 14—14 at opposite ends thereof. In the upper wall or roof of the passage 12 there is mounted a flexible diaphragm 16, which is operatively pressed against a stack of piezo-electric crystals 18. The crystals of each receiver are operatively connected to a preamplifier N in its case. The multiple conductor cable A is made up of sections connected to the ends of the case 10 and is arranged to connect outputs of the preamplifiers in the respective receivers $D_1 \ldots D_6$ by means of suitable conductors through the corresponding amplifiers $A_1 \ldots A_6$. The cable is also arranged to lead power from a power supply V at the surface to the preamplifiers. Such a hydrophone and such a cable arrangement are described in detail and claimed in copending patent applications Serial No. 366,030 filed July 3, 1953, now Patent No. 2,757,355, and Serial No. 355,507 filed May 18, 1953.

One of the advantages of employing hydrophones as receivers is that they tend to be uniformly coupled to the different portions of the wall of the receiver hole. When hydrophones are so employed, they respond to seismic waves with substantially the same frequency and phase response characteristics, instead of responding differently as is often the case when inertia-type seismometers are employed at the surface. Thus, such use of hydrophones tends to eliminate uncertain irregularities in the timing of the recording of the waves that would otherwise be introduced by the interaction of seismometers with the ground at the surface.

Another advantage of employing hydrophones rather than inertia-type seismometers is that hydrophones are relatively insensitive to waves traveling thereto along the cable itself. For this reason, the use of hydrophones instead of inertia-type seismometers in a shot hole produces clearer records practically undisturbed by waves traveling along the cable itself, all as explained in copending patent application Serial No. 625,190 filed November 29, 1956. It is thus seen that increased accuracy in the measurement of the times of arrival of the seismic waves at the receiver hole $R_1$ is attained by the use of hydrophones as receivers.

By virtue of the various factors involved in this invention in improving the accuracy of timing of the recording of the reflected waves, the time of travel of a seismic wave from a shot point to a datum plane adjacent the receiver hole may readily be measured to an accuracy of 0.001 or 0.002 second, whereas, if ordinary methods of reflection seismic surveying were employed, errors as large as 0.003 or 0.004 second might very well occur. When it is recalled that the strike and dip of underlying formations are determined by the differences in travel time of waves reflected from different portions of the strata, it will be appreciated that the reduction of the errors by the amount indicated is very important. Such reduction of errors is particularly important where an attempt is being made to determine where low dip strata pinch out beneath an unconformity and where small differences in dip or other small differences in the properties of strata are to be determined.

In conducting a reflection seismic survey in accordance with this invention, similar records may be obtained by generating waves at the bottom of the shot hole $S_2$ and receiving them at receiver hole $R_1$, then repeating the process for waves generated in shot hole $S_3$. In this way, records may be obtained of waves reflected from a series of points $P_{11}$, $P_{12}$, $P_{13}$ at the interface between the strata $F_{14}$ and $F_{15}$. Likewise, by generating seismic waves at shot holes $S_1$, $S_2$ and $S_3$ and recording the waves at seismic wave receivers located in the manner described above in receiver hole $R_2$, records may be obtained of waves that have been reflected from points $P_{21}$, $P_{23}$ and $P_{24}$ at the interface between strata $F_{14}$ and $F_{15}$. These points of reflection lie in a continuous series on a portion of the interface that has a length slightly less than the distance between the receiver holes $R_1$ and $R_2$, thus providing a substantially continuous survey at that interface in a manner somewhat similar to that employed in continuous profiling. Similar remarks, of course, apply to interfaces between the other strata from which distinctive reflections can be recognized. By repeating the process for the other receiver holes and other shot holes along the line of exploration, an extended continuous survey of the underlying formations may be made.

If desired, of course, the number of shot holes located between the successive receiver holes may be either increased or decreased, according to the degree of refinement required in the survey, and according to the amount of difficulty involved in recognizing reflections from successive horizontal portions of the underlying strata. In fact, where "marker beds" are present that produce readily recognized reflections from widely spaced-apart portions of the subterranean formations, it is sufficient if only one shot point is located midway between successive receiver points. In such a case, a record is usually made at each receiver point of waves generated at each shot point on opposite sides thereof.

It will be understood, of course, that no time break TB need be recorded if only the difference in depths of certain strata is to be determined, as when the location of one of the strata is already accurately known. Ordinarily, however, the instants of detonation of the waves are noted on the records and the time required for waves to travel to the receivers is measured.

In any event, as will be understood by those skilled in the art, in applying this invention to the making of a reflection seismic survey, the depths at which the receivers $D_1 \ldots D_6$ are located at each receiver hole and the depths at which the explosive charges E are placed, are all accurately measured. These data together with data regarding the spacing of the shot holes and the receiver holes and data respecting the times of arrival of waves at given depths in the receiver holes, together with information regarding the velocities with which the seismic waves travel, are employed in calculating the location of the points from which the received seismic waves have been reflected. The methods of employing such data in locating the reflection points of recorded waves and in calculating the strike and dip and other structural characteristics of subterranean formations are so similar to the methods employed in conventional seismic surveying methods that they will not be obvious to those skilled in the art having the teachings of this application before them. For that reason the methods of making calculations are not described in detail here.

This invention is particularly useful where a high degree of accuracy is desired in the determination of the strike and dip of underlying formations, and is thus particularly useful where the dips are small and where small differences in dips may mean the difference between the presence or absence of a mineral deposit at a particular position in the area being surveyed. While this invention has been described with reference to the use of specific apparatus and a specific arrangement of shot points and receiver points, it will be obvious that the invention is not limited thereto but is capable of a variety of embodiments. Various changes which will not suggest themselves to those skilled in the art may be made in the form, material, details of construction and arrangement of the various elements of the invention without departing from its main principles. It is therefore to be understood that the invention includes not only the specific forms thereof illustrated in the drawings and described in detail herein, but also includes all other embodiments thereof within the scope of the appended claims.

The invention claimed is:

1. In reflection seismic surveying in an area in which a weathered layer overlies subsurface strata, the steps which comprise: generating seismic waves at a series of relatively shallow horizontally spaced-apart sources beneath the weathered layer; receiving seismic waves from the respective sources at a series of relatively deep reception points spaced horizontally from said sources and spaced vertically from each other beneath the weathered layer after the waves from the respective sources have been reflected from a subsurface stratum; and measuring the relative times of travel of the seismic waves from the respective sources to the respective points of reflection at said stratum and thence to said reception points.

2. In reflection seismic surveying in an area in which a weathered layer overlies subsurface strata, the steps which comprise: generating seismic waves at a series of horizontally spaced sources beneath the weathered layer; receiving seismic waves from the respective sources at a series of reception points spaced horizontally from said sources and spaced vertically from each other beneath the weathered layer after the waves from the respective sources have been reflected from a sub-surface stratum; and measuring the relative times of travel of the seismic waves from the respective sources to the respective points of reflection at said stratum and thence to said reception points.

3. The method of reflection seismic surveying defined in claim 2 in which the reception points are located at least about 75 feet beneath the weathered layer and the reception points are about 10 feet apart.

4. In reflection seismic surveying in an area in which a weathered layer overlies sub-surface strata, the steps which comprise: generating seismic waves at a first source beneath said weathered layer; receiving seismic waves from said first source at a series of reception points spaced horizontally from said first source and spaced vertically from each other beneath the weathered layer after the waves from said first source have been reflected from a sub-surface stratum; generating seismic waves at a second source beneath said weathered layer at a position horizontally spaced from said first source; receiving seismic waves from said second source at said series of reception points after the waves from said second source have been reflected from said sub-surface stratum; and measuring the relative times of travel of the seismic waves from the respective sources to the respective points of reflection at said stratum and thence to said reception points.

5. The method of seismic surveying defined in claim 4 in which the respective sources are located about equal distances from said reception points on opposite sides thereof and are relatively shallow, and the series of reception points are relatively deep.

6. The method of reflection seismic surveying defined in claim 5 in which the reception points are located at least about 75 feet beneath the weathered layer and the reception points are about 10 feet apart.

7. In reflection seismic surveying in an area in which a weathered layer overlies sub-surface strata, the steps which comprise: generating a first train of seismic waves at a source beneath the surface of the earth; receiving said first train of seismic waves at a first series of reception points spaced horizontally from said source and spaced vertically from each other beneath the weathered layer after said first train of seismic waves has been reflected from a sub-surface stratum; recording said first train of seismic waves as it is received at said first series of reception points after reflection from said sub-surface stratum; generating a second train of seismic waves at said source; receiving said second train of seismic waves after reflection from a sub-surface stratum at a second series of reception points spaced horizontally from said source and spaced vertically from each other beneath the surface of the earth; and recording said second train of seismic waves as it is received at said second series of reception points after reflection from said sub-surface stratum; whereby the relative times of travel of the seismic waves from the source to the respective points of reflection at said stratum and thence to said reception points may be ascertained.

8. The method of seismic surveying defined in claim 7 in which the respective series of reception points are about equal distances from said source on opposite sides thereof and are relatively deep and the source is relatively shallow.

9. The method of reflection seismic surveying defined in claim 8 in which the reception points are located at least about 75 feet beneath the weathered layer and the reception points are about 10 feet apart.

10. In reflection seismic surveying in an area in which a weathered layer overlies sub-surface strata, the steps which comprise: generating seismic waves at a source beneath the weathered layer; receiving seismic waves from said source at a series of reception points spaced horizontally from said source and spaced vertically from each other beneath the weathered layer after said waves have been reflected from a sub-surface stratum; and measuring the times of travel of the seismic waves from said source to the point of reflection at said stratum and thence to said reception points.

11. The method of reflection seismic surveying defined in claim 10 in which the waves are received at reception points that are located at least about 75 feet beneath the weathered layer and the reception points are about 10 feet apart.

12. In reflection seismic surveying in an area in which a weathered layer overlies sub-surface strata, the steps which comprise: generating a first train of seismic waves at a source beneath the surface of the earth; receiving said first train of seismic waves at a first series of reception points spaced horizontally from said source and spaced vertically from each other beneath the weathered layer after said first train of seismic waves has been reflected from a first portion of a sub-surface stratum; generating a second train of seismic waves at said source; receiving said second train of seismic waves after reflection from a second portion of a subsurface stratum at a second series of reception points spaced horizontally from said source and spaced vertically from each other beneath the surface of the earth; and measuring the relative times of travel of the seismic waves from the source to the respective points of reflection at said stratum and thence to said reception points.

13. In reflection seismic surveying in an area in which a weathered layer overlies subsurface strata, the steps which comprise: generating a first train of seismic waves at a source beneath the surface of the earth; receiving said first train of seismic waves at a first series of reception points spaced horizontally from said source and spaced vertically from each other beneath the weathered layer after said first train of seismic waves has been reflected from a first portion of a subsurface stratum; measuring the relative times required for seismic waves to travel from said source to said first series of reception points along paths from said source to points on said subsurface stratum and from the latter points by reflection to said first series of reception points; generating a second train of seismic waves at said source; receiving said second train of seismic waves after reflection from a second portion of a subsurface stratum at a second series of reception points spaced horizontally from said source and spaced vertically from each other beneath the surface of the earth; and measuring the relative times required for seismic waves to travel from said source to said second series of reception points along paths from said source to points on said subsurface stratum and from the latter points by reflection to said second series of reception points.

14. In apparatus for reflection seismic surveying in an area in which a weathered layer overlies sub-surface strata, the combination of: a plurality of seismic wave receivers located at a series of receiver positions located in a substantially straight vertical line beneath the weathered layer; means for generating seismic waves at a seismic wave generating position that is located at a position displaced horizontally from said vertical line and is at a relatively shallow depth beneath the weathered layer and above said receiver positions, thereby causing seismic waves to be propagated downwardly to such strata and to be reflected upwardly therefrom to said series of receiver positions;

and means including a multiple-element oscillograph having a plurality of recording elements controlled by the respective receivers for recording oscillograph traces representing said reflected waves received at the respective receivers in side-by-side relationship on a common recording medium, the spacing between said receiver positions being a small fraction of the wavelength of a large portion of the energy present in the reflected waves that are received at said receiver positions, whereby successive traces tend to nest in an echelon pattern, thus facilitating the recognition of records of the same reflected wave on successive traces.

References Cited in the file of this patent

UNITED STATES PATENTS

| | | |
|---|---|---|
| 1,240,328 | Fessenden | Sept. 18, 1917 |
| 1,676,619 | McCollum | July 10, 1928 |
| 1,909,205 | McCollum | May 16, 1933 |
| 2,137,985 | Salvatori | Nov. 22, 1938 |
| 2,259,478 | Morgan | Oct. 21, 1941 |
| 2,329,721 | Hoover et al. | Sept. 21, 1943 |
| 2,340,272 | McCarty | Jan. 25, 1944 |
| 2,503,904 | Dahm | Apr. 11, 1950 |
| 2,635,705 | Haggerty | Apr. 21, 1953 |
| 2,712,124 | Ording | June 28, 1955 |
| 2,718,930 | Bazhaw | Sept. 27, 1955 |

U. S. DEPARTMENT OF COMMERCE
PATENT OFFICE

CERTIFICATE OF CORRECTION

Patent No. 2,792,067                                            May 14, 1957

Raymond A. Peterson

It is hereby certified that error appears in the printed specification of the above numbered patent requiring correction and that the said Letters Patent should read as corrected below.

Column 2, line 25, for "adjacent part" read -- surface --; line 26, for "surface" read -- adjacent part --; column 4, line 70, for "galvonomeer" read -- galvanometer --; line 72, for "circuit A" read -- circuit $A_7$ --; column 5, lines 16 and 17, for "galonometer", each occurrence, read -- galvanometer --; column 6, line 33, for "receiver" read -- receivers --; column 8, lines 42 and 57, for "not", each occurrence, read -- now --.

Signed and sealed this 8th day of April 1958.

(SEAL)
Attest:

KARL H. AXLINE
Attesting Officer
                                                                    ROBERT C. WATSON
                                                                    Commissioner of Patents